United States Patent
Kern et al.

(10) Patent No.: US 10,184,831 B2
(45) Date of Patent: Jan. 22, 2019

(54) SYSTEMS AND METHODS FOR TESTING TWO-COLOR DETECTORS

(71) Applicant: Kidde Technologies, Inc., Wilson, NC (US)

(72) Inventors: Mark T. Kern, Goleta, CA (US); Ken Bell, Raleigh, NC (US); Terry Simpson, Wake Forest, NC (US); Christopher Wilson, New Haven, VT (US); David Frasure, Wilson, NC (US); Charles B. McLean, Wilson, NC (US); Clinton E. Piland, Raleigh, NC (US)

(73) Assignee: Kidde Technologies, Inc., Wilson, NC (US)

( * ) Notice: Subject to any disclaimer, the term of this patent is extended or adjusted under 35 U.S.C. 154(b) by 325 days.

(21) Appl. No.: 15/001,372

(22) Filed: Jan. 20, 2016

(65) Prior Publication Data

US 2017/0205286 A1    Jul. 20, 2017

(51) Int. Cl.
*H01J 40/14*    (2006.01)
*G01J 3/02*    (2006.01)
(Continued)

(52) U.S. Cl.
CPC .............. *G01J 3/0297* (2013.01); *G01J 3/10* (2013.01); *G01J 3/501* (2013.01); *G01J 5/0018* (2013.01);
(Continued)

(58) Field of Classification Search
CPC .. G01J 3/0297; G01J 3/10; G01J 3/501; G01J 5/0018
(Continued)

(56) References Cited

U.S. PATENT DOCUMENTS 7,202,794 B2    4/2007  Huseynov et al.
7,638,770 B2 *  12/2009  Serero ................... G08B 17/12
                                                                 250/339.05
(Continued)

FOREIGN PATENT DOCUMENTS

CN           2516966 Y     10/2002
JP        2002197557 A      7/2002

OTHER PUBLICATIONS

Extended European Search report dated Jul. 19, 2017, (which also contains a machine translation of Japanese cited reference JP 2002197557) issued during the prosecution of European Patent Application No. 17150221.4 (37 pages).

*Primary Examiner* — Kevin Pyo
(74) *Attorney, Agent, or Firm* — Locke Lord LLP; Scott D. Wofsy; Alicia J. Carroll

(57) ABSTRACT

A method for calibrating a test light to simulate a fire includes measuring a baseline resistance induced in a sensor cell of a two-color detector in response to a controlled fire. The method includes monitoring a test resistance induced in the sensor cell in response to exposure to emissions from a test light and adjusting the emissions of the test light until the test resistance of the sensor cell equals the baseline resistance of the sensor cell to achieve a calibration setting for the test light. A test light for a detector includes a housing and a first LED within the housing having a first emission wavelength. A second LED is within the housing. The second LED has a second emission wavelength. The second emission wavelength is different than the first emission wavelength.

14 Claims, 2 Drawing Sheets

(51) Int. Cl.
*G01J 3/10* (2006.01)
*G01J 3/50* (2006.01)
*H05B 33/08* (2006.01)
*G01J 5/00* (2006.01)
*G08B 29/14* (2006.01)
*G01J 5/20* (2006.01)
*G01J 5/60* (2006.01)

(52) U.S. Cl.
CPC ....... *G08B 29/145* (2013.01); *H05B 33/0845* (2013.01); *G01J 5/20* (2013.01); *G01J 5/60* (2013.01); *G01J 2003/102* (2013.01); *G01J 2005/0048* (2013.01)

(58) Field of Classification Search
USPC .................................................. 250/221, 226
See application file for complete search history.

(56) References Cited

U.S. PATENT DOCUMENTS

2015/0204727 A1 7/2015 Bell et al.
2015/0213699 A1 7/2015 Bell et al.

* cited by examiner

SYSTEMS AND METHODS FOR TESTING TWO-COLOR DETECTORS

BACKGROUND OF THE INVENTION

1. Field of the Invention

The present invention relates to two-color detectors, in particular to two-color detectors such as cadmium sulfide (CdS) flame detectors.

2. Description of Related Art

Two-color detectors, such as CdS flame detectors, typically use two visible wavelengths to distinguish fires from non-fires, for example, green and red within the visible spectrum. The settings for these two-color detectors generally are made to avoid false responses to sunlight. Traditional testing of two-color detectors in remote installations, e.g. field testing, can be done with a flashlight with either a red or green window over the light bulb. Flashlights emitting either red or green light can determine whether the two-color detector is working, e.g. when the red light is being used the flame detector indicates a positive signal and when the green light is being used the flame detector indicates a negative signal. The detector itself, however, provides no way of determining whether the two-color detector has lost any of its original sensitivity to light generated by fires.

Such conventional methods and systems have generally been considered satisfactory for their intended purpose. However, there is still a need in the art for systems and methods that allow for improved testing of two-color detectors. The present invention provides a solution for these problems.

SUMMARY OF THE INVENTION

A method for calibrating a test light to simulate a fire includes measuring a baseline resistance induced in a sensor cell of a two-color detector in response to a controlled fire. The method includes monitoring a test resistance induced in the sensor cell in response to exposure to emissions from a test light and adjusting the emissions of the test light until the test resistance of the sensor cell equals the baseline resistance of the sensor cell to achieve a calibration setting for the test light.

In accordance with some embodiments, measuring the baseline resistance includes measuring and collecting waveform data based on the response from the two-color detector using an oscilloscope and calculating the baseline resistance across the sensor cell based on the waveform data. Adjusting the emissions of the test light can include adjusting an amplitude of at least one of two light-emitting diodes (LEDs) of the test light with a control circuit. The method can include storing the calibrated setting in a memory operatively connected to a control circuit. Monitoring the test resistance induced in the sensor cell in response to exposure to the emissions from the test light can include generating the emissions at a given wavelength with at least one LED of the test light and directing the emissions at an input of the two-color detector. Generating the emissions at the given wavelength with at least one LED of the test light can include generating emissions having a wavelength selected from the group consisting of a green wavelength, a red wavelength, and a near-infrared wavelength.

It is contemplated that monitoring the test resistance induced in the sensor cell in response to exposure to the emissions from the test light can include generating respective emissions with two LEDs of the test light and directing the emissions at an input of the two-color detector. Wavelengths of the two emissions can be different from one another. Generating respective emissions with two LEDs of the test light can include generating a first emission having a green wavelength, a red wavelength, or a near-infrared wavelength, and generating a second emission having a wavelength different from the wavelength of the first emission.

In accordance with another aspect, a test light for a detector includes a housing and a first LED within the housing having a first emission wavelength. A second LED is within the housing having a second emission wavelength different than the first emission wavelength.

The test light can include a control circuit operatively connected to each of the LEDs to adjust respective amplitudes of the LEDs. A memory can be operatively connected to each of the LEDs to store a calibration setting for each of the LEDs. The calibration setting can be generated by the method described above. The first and second emission wavelengths can be a green wavelength, a red wavelength, and/or a near-infrared wavelength.

In accordance with another aspect, a two-color detector system kit includes a two-color detector and a test light, as described above, calibrated for the two-color detector. The two-color detector can be a first of a plurality of two-color detectors. In accordance with certain embodiments, the test light includes a memory operatively connected to each of the LEDs to store a plurality of calibration settings for each of the LEDs, wherein each of the calibration settings corresponds to a respective one of the plurality of two-color detectors. Or in an alternative embodiment, the test light is a first of a plurality of test lights. Each of the plurality of test lights can be calibrated for a respective one of the plurality of two-color detectors.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
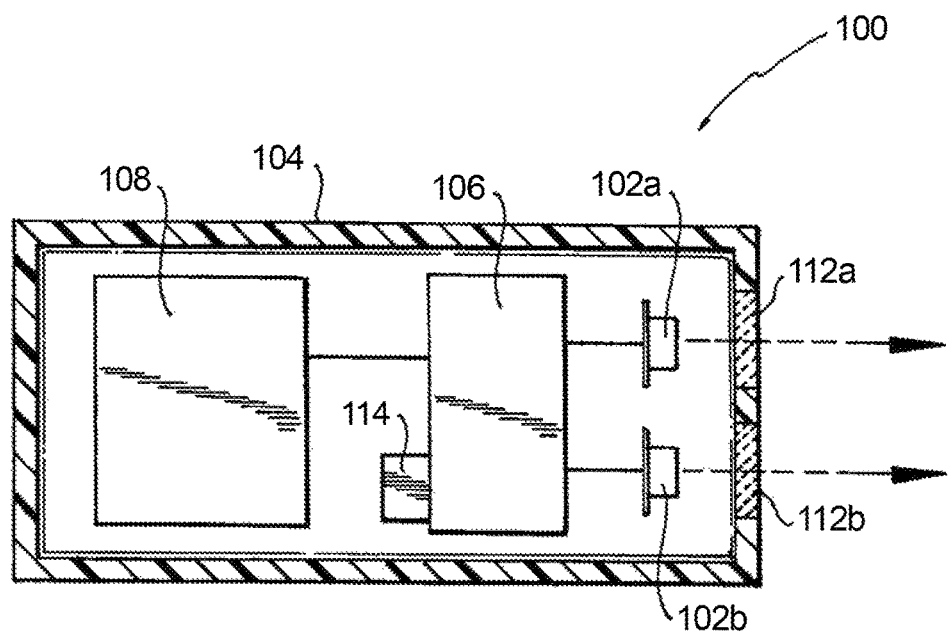
FIG. 1 is a schematic depiction of an exemplary embodiment of a test light constructed in accordance with an embodiment of the present disclosure.

Reference will now be made to the drawings wherein like reference numerals identify similar structural features or aspects of the subject disclosure. For purposes of explanation and illustration, and not limitation, a schematic depiction of an exemplary embodiment of a test light in accordance with the disclosure is shown in FIG. 1 and is designated generally by reference character 100. Other embodiments of a test light, a two-color detector system kit, and/or methods for calibrating a test light in accordance with the disclosure, or aspects thereof, are provided in FIGS. 2-3, as will be described.

Embodiments of this invention provide a test light that incorporates two different color light-emitting diodes (LEDs) in an array that is calibrated for the sensitivity of a two-color detector, e.g. a cadmium-sulfide (CdS) flame detector. Detectors can degrade over time, affecting the detectors ability to detect fires and in its susceptibility to false-positive detection events, e.g. due to sunlight. Embodiments of this invention provide for a calibration system by calibrating the amplitude of the LEDs in a fixture that mates to the front of the detector. The test device can determine whether the two-color detector has lost its original sensitivity to fires.

Figure 2:
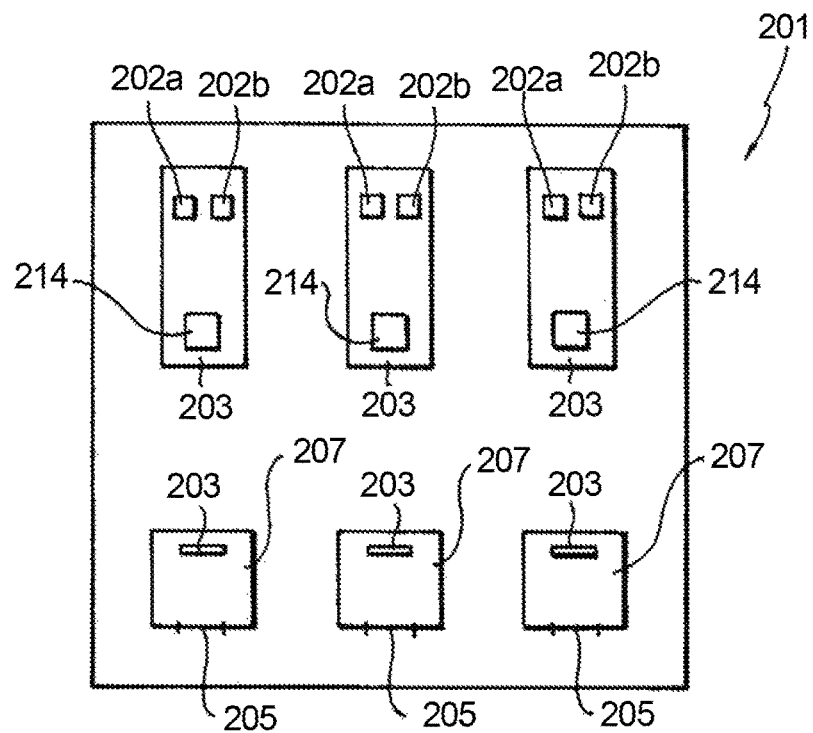
FIG. 2 is a schematic depiction of a two-color detector system kit constructed in accordance with an embodiment of the present disclosure.

As shown in FIG. 1, a test light 100 for a detector, e.g. a two-color detector 207 as shown in FIG. 2, includes a housing 104 and a first LED 102a within housing 104. First LED 102a has a first emission, indicated schematically by the dashed arrow, with a first emission wavelength and first variable amplitude. A second LED 102b is within housing 104. Second LED 102b has a second emission, indicated schematically by the dashed arrow, with a second emission wavelength and second variable amplitude. The second emission wavelength is different than the first emission wavelength. First and second emission wavelengths can be a variety of wavelengths, for example, a green wavelength, a red wavelength, and a near-infrared wavelength. It is contemplated that first and second emission wavelengths can both be near-infrared wavelengths that are different from one another. For example, the first emission wavelength can range from 0.4 μm to 1.1 μm (instead of a green light) and the second emission wavelength can be 1.1 μm (instead of a red light). In accordance with some embodiments, for example, for testing a silicon-germanium detector (or a silicon-InGaAs detector), the first emission wavelength can range from 0.8 μm to 1.1 μm (instead of a green light) and the second emission wavelength can range from 1.1 μm to 1.7 μm (instead of a red light). It is also contemplated that the either the first or second emissions can exceed 1.7 μm.

With continued reference to FIG. 1, test light 100 includes a control circuit 106 operatively connected to each of LEDs 102a and 102b to adjust respective amplitudes of LEDs 102a and 102b. A memory 114 is operatively connected to each of the LEDs 102a and 102b through control circuit 106 to store a calibration setting for each of LEDs 102a and 102b. Power is provided through a power source 108, e.g. a battery. The calibration setting is generated by the method described below.

With reference now to FIG. 2, a two-color detector system kit 201 includes two-color detectors 207, e.g. CdS flame detectors, and corresponding calibrated test lights 200. Each test light 200 is similar to test light 100, as described above. Each test light 200 is calibrated for a respective two-color detector 207 of kit 201. Each test light 200 includes a memory 214, similar to memory 114, and a respective pair of LEDs 202a and 202b, similar to LEDs 102a and 102b, described above. It is also contemplated that each test light 200 can include a control circuit and battery, similar to control circuit 106 and battery 108. Each two-color detector includes a sensor cell 203. Sensor cells 203 are configured to detect emissions of a flame coming through input 205. Sensor cells 203 are configured, in their fully functional state, to detect fire but not sunlight. Test lights 200, using the calibration method below, are calibrated to simulate a fire, instead of generically testing for detection of red light, as was done in traditional test lights.

With continued reference to FIG. 2, it is contemplated that instead of three calibrated test lights 200 and three corresponding two-color detectors 207, kit 201 can include any number of test lights 200 and any number of two-color detectors 207. For example, kit 201 can include a single test light 200 and a plurality of two-color detectors 207. Memory 214 of test light 200 can store a plurality of calibration settings, for example, one for each of a plurality of two-color detectors 207. It is contemplated that the test light can include a switch to change between respective calibration settings depending on detector is being tested.

Figure 3:
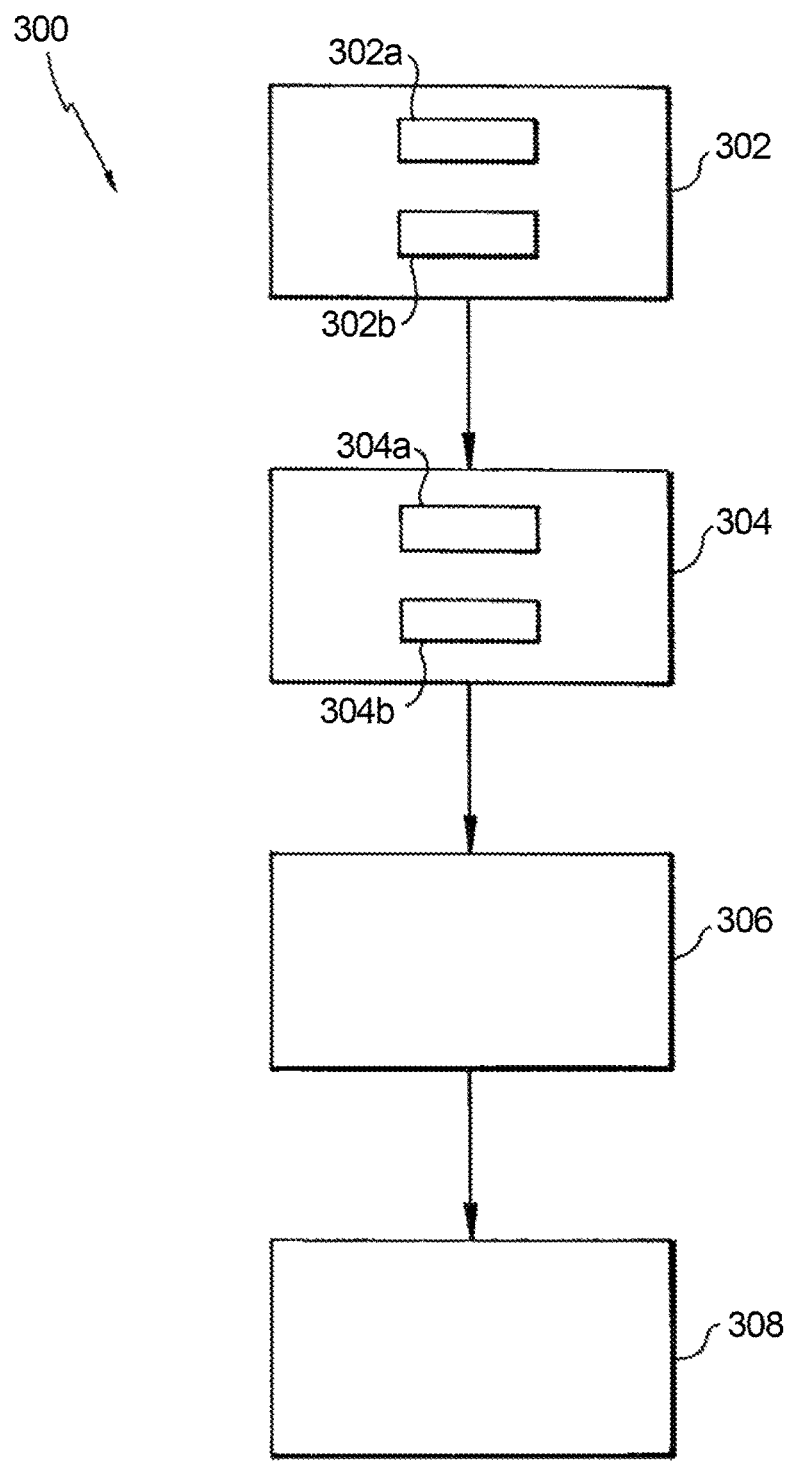
FIG. 3 is a flow chart schematically depicting a method for calibrating a test light in accordance with an embodiment of the present disclosure.

As shown in FIG. 3, a method 300 for calibrating a test light 100, e.g. test light 100, includes two main components. First, a calibration standard is set by measuring a baseline resistance in response to a fire and then a test light is calibrated to induce that same resistance. Method 300 includes measuring a baseline resistance induced in a sensor cell, e.g. sensor cell 203, of a two-color detector, e.g. two-color detector 207, in response to a controlled fire, e.g. a pan fire, indicated schematically by box 302. Measuring the baseline resistance includes measuring and collecting waveform data based on the response from the two-color detector using an oscilloscope, shown schematically by box 302a, and calculating the baseline resistance across the sensor cell based on the waveform data, shown schematically by box 302b.

With continued reference to FIG. 3, method 300 includes monitoring a test resistance induced in the sensor cell in response to exposure to emissions from the test light, indicated schematically by box 304. Monitoring the test resistance includes affixing the test light to a frame operatively connected to the detector and generating the emissions at a given wavelength with at least one LED, e.g. LEDs 102a and/or 102b, of the test light and directing the emissions at an input, e.g. input 205, of the two-color detector, indicated schematically by box 304a. The emissions can have a variety of suitable wavelengths, for example, a green wavelength, a red wavelength, and a near-infrared wavelength. The wavelengths of the two emissions are different from one another. Generating respective emissions with two LEDS of the test light 100 includes generating a first emission having a wavelength selected from the group consisting of a green wavelength, a red wavelength, and a near-infrared wavelength, and generating a second emission having a wavelength different from the wavelength of the first emission. It is contemplated that the emissions can be two different near-infrared wavelengths, or one can be a red wavelength and one can be a near-infrared wavelength, for example.

Method 300 includes adjusting the emissions of the test light by adjusting an amplitude of one or both of the LEDs after or during the monitoring of the test resistance until the test resistance of the sensor cell equals the baseline resistance of the sensor cell to achieve a calibration setting for the test light, as indicated by box 306. The respective amplitudes of the emissions of the test light are adjusted through a control circuit, e.g. control circuit 106. Method 300 includes storing the calibrated setting in a memory 114 operatively connected to a control circuit 106, as indicated by box 308. This results in a test light configured to induce the same resistance response in the same detectors as the fire did, e.g. the test light more accurately simulates a fire than traditional test lights, and is not mistaken for sunlight. During field testing, this allows for a more specific test of the detectors as compared with traditional test lights.

The methods and systems of the present disclosure, as described above and shown in the drawings, provide for a test light, a two-color detector system kit, and methods for calibrating a test light with superior properties, including more accurate in-field testing, resulting in improved detector performance. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method for calibrating a test light to simulate a fire comprising:
measuring a baseline response induced in a sensor cell of a two-color detector in response to a controlled fire;
monitoring a test response induced in the sensor cell in response to exposure to emissions from a test light; and
adjusting the emissions of the test light until the test response of the sensor cell equals the baseline response of the sensor cell to achieve a calibration setting for the test light.

2. The method for calibrating as recited in claim 1, wherein measuring the baseline response includes measuring a baseline resistance by collecting waveform data based on the baseline response from the two-color detector using an oscilloscope and calculating the baseline resistance across the sensor cell based on the waveform data.

3. The method for calibrating as recited in claim 1, wherein monitoring the test response induced in the sensor cell in response to exposure to the emissions from the test light includes generating the emissions at a given wavelength with at least one LED of the test light and directing the emissions at an input of the two-color detector.

4. The method for calibrating as recited claim 3, wherein generating the emissions at the given wavelength with at least one LED of the test light includes generating emissions having a wavelength selected from the group consisting of a green wavelength, a red wavelength, and a near-infrared wavelength.

5. The method for calibrating as recited in claim 1, wherein monitoring the test response induced in the sensor cell in response to exposure to the emissions from the test light includes generating respective emissions with two LEDs of the test light and directing the emissions at an input of the two-color detector, wherein wavelengths of the two emissions are different from one another.

6. The method for calibrating as recited in claim 5, wherein generating respective emissions with two LEDs of the test light includes generating a first emission having a wavelength selected from the group consisting of a green wavelength, a red wavelength, and a near-infrared wavelength, and generating a second emission having a wavelength different from the wavelength of the first emission.

7. The method for calibrating as recited in claim 1, wherein adjusting the emissions of the test light includes adjusting an amplitude of at least one of two LEDs of the test light with a control circuit.

8. The method for calibrating as recited in claim 1, further comprising storing the calibrated setting in a memory operatively connected to a control circuit.

9. A test light for a detector comprising:
a housing;
a first LED within the housing having a first emission wavelength; and
a second LED within the housing having a second emission wavelength, wherein the second emission wavelength is different than the first emission wavelength;
wherein the test light includes at least one calibration setting generated by measuring a baseline response induced in a sensor cell of a two-color detector in response to a controlled fire, monitoring a test response induced in the sensor cell in response to exposure to emissions from the test light, and adjusting the emissions of the test light until the test response of the sensor cell equals the baseline response of the sensor cell.

10. The test light as recited in claim 9, further comprising a control circuit operatively connected to each of the LEDs to adjust respective amplitudes of the LEDs.

11. The test light as recited in claim 9, further comprising a memory operatively connected to each of the LEDs to store a calibration setting for each of the LEDs.

12. The test light as recited in claim 9, wherein the first and second emission wavelengths are selected from the group consisting of a green wavelength, a red wavelength, and a near-infrared wavelength.

13. A two-color detector system kit comprising:
a two-color detector; and
a test light calibrated for the two-color detector, the test light including:
a first LED having a first emission wavelength; and
a second LED having a second emission wavelength, wherein the second emission wavelength is different than the first emission wavelength, wherein the second emission wavelength is different than the first emission wavelength, wherein the test light includes at least one calibration setting generated by measuring a baseline response induced in a sensor cell of the two-color detector in response to a controlled fire, monitoring a test response induced in the sensor cell in response to exposure to emissions from the test light, and adjusting the emissions of the test light until the test response of the sensor cell equals the baseline response of the sensor cell.

14. The kit as recited in claim 13, wherein the two-color detector is a first of a plurality of two-color detectors, wherein the test light includes a memory operatively connected to each of the LEDs to store a plurality of calibration settings for each of the LEDs, wherein each of the calibration settings corresponds to a respective one of the plurality of two-color detectors.

* * * * *